(12) United States Patent
Yokoyama et al.

(10) Patent No.: US 7,866,822 B2
(45) Date of Patent: Jan. 11, 2011

(54) VIDEO PROJECTOR USING COHERENT LIGHT SOURCE

(75) Inventors: Toshifumi Yokoyama, Osaka (JP); Kazuhisa Yamamoto, Osaka (JP); Hiroyuki Furuya, Nara (JP)

(73) Assignee: Panasonic Corporation, Osaka (JP)

( * ) Notice: Subject to any disclaimer, the term of this patent is extended or adjusted under 35 U.S.C. 154(b) by 883 days.

(21) Appl. No.: 11/667,111

(22) PCT Filed: Nov. 4, 2005

(86) PCT No.: PCT/JP2005/020321
§ 371 (c)(1),
(2), (4) Date: May 7, 2007

(87) PCT Pub. No.: WO2006/049262
PCT Pub. Date: May 11, 2006

(65) Prior Publication Data
US 2008/0036921 A1    Feb. 14, 2008

(30) Foreign Application Priority Data
Nov. 8, 2004    (JP) .............................. 2004-323349

(51) Int. Cl.
*G03B 21/00* (2006.01)
(52) U.S. Cl. ........................................................ 353/31
(58) Field of Classification Search ................ 372/6, 372/69–72; 250/227.18; 348/756; 353/31; 385/32
See application file for complete search history.

(56) References Cited

U.S. PATENT DOCUMENTS

| 6,018,413 A | 1/2000 | Oka |
| 6,467,910 B1 * | 10/2002 | Sato ............................. 353/84 |
| 6,594,090 B2 | 7/2003 | Kruschwitz et al. |
| 6,614,815 B1 * | 9/2003 | Kane et al. ..................... 372/6 |
| 2003/0039036 A1 | 2/2003 | Kruschwitz et al. |

FOREIGN PATENT DOCUMENTS

| EP | 1 292 134 | 3/2003 |
| JP | 10-301153 | 11/1998 |
| JP | 2002-94156 | 3/2002 |
| JP | 2002-214706 | 7/2002 |
| JP | 2003-98476 | 4/2003 |
| JP | 2003202453 A * | 7/2003 |
| JP | 2003-233123 | 8/2003 |
| JP | 2003233123 A * | 8/2003 |
| JP | 2005-159075 | 6/2005 |

* cited by examiner

*Primary Examiner*—Georgia Y Epps
*Assistant Examiner*—Danell L Owens
(74) *Attorney, Agent, or Firm*—Wenderoth, Lind & Ponack, L.L.P.

(57) ABSTRACT

In the video projector of the present invention, a fiber part of a fiber laser is disposed so as to draw a circulating orbit of more than one circulation along the inner wall of the projector housing. Further, an FBG which is part of the fiber laser is fixed so that its shape is not changed. Furthermore, a pump LD part of the fiber laser is disposed apart from the SHG element. As a result, the video projector can be miniaturized, and the portability and installment of the video projector are facilitated. Further, the output stabilization of the fiber laser can be realized by preventing a shape change of the FBG. Furthermore, by disposing the SHG element apart from the pump LD part which forms a heat source, the temperature change of the SHG element is suppressed and the wavelength conversion efficiency by the SHG element is enhanced.

14 Claims, 8 Drawing Sheets

Fig.8

# VIDEO PROJECTOR USING COHERENT LIGHT SOURCE

TECHNICAL FIELD

The present invention relates to a video projector using a coherent light source and peripheral parts thereof, and more particularly to a computer and a video output device which include the video projector.

BACKGROUND ART

Figure 7:
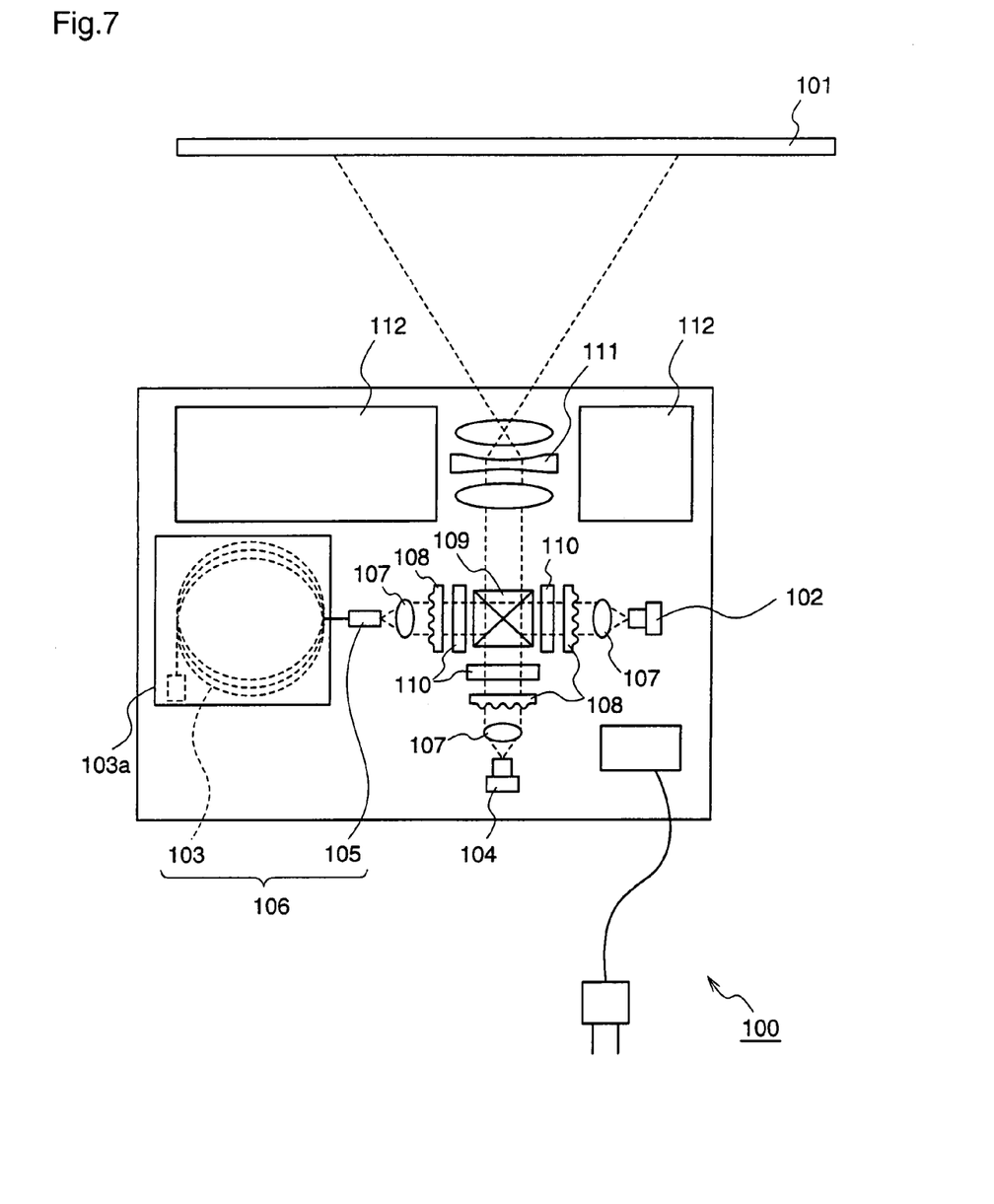
FIG. 7 is a diagram for illustrating a schematic construction of a conventional video projector.

FIG. 7 is a diagram for illustrating the schematic construction of a laser display 100 as one example of a conventional video projector.

The conventional laser display 100 shown in FIG. 7 comprises laser light sources 102, 104, 106 for generating red, green, and blue laser beams, lenses 107 for converting laser beams into parallel lights, integrators 108 for equalizing light intensity of the light that has transmitted through the lens 107, a LCD panel 110 for transmitting the light from the integrator 108, a control circuit 112 for controlling the LCD panel 110, a transmission light prism 109 for multiplexing the light that has transmitted through the LCD panel 110, and a projection lens 111 for projecting the light which has come from the transmission light prism 109 onto a screen 101.

The laser light sources 102, 104 are semiconductor lasers, and they irradiate a blue and a red laser beam, respectively. Further, the laser light source 106 includes a fiber laser 103 and an SHG element 105, and irradiates a green laser beam by wavelength converting near-infrared light having a wavelength in the vicinity of 1060 nm which is irradiated from the fiber laser 103 using the SHG element 105.

Next, the operation of the conventional laser display 100 will be described.

Three color lasers of red, green, and blue emitted from the respective laser light sources 102, 104, 106 are converted into parallel lights by using the lenses 107, and are equalized in light intensity by using the integrators 108, to transmit through the LCD panel. The transmitted lights are modulated according to RGB signals at the LCD panels, respectively.

The lights which have been transmitted through the corresponding LCD panel 110 are synthesized by using the transmission light prism 109, and are projected onto the screen 101 by using the projection lens 111.

In this way, a two-dimensional image is displayed on the screen 101.

In this conventional video projector, since the lights of the respective RGB light sources are monochrome lights, a displayable color range can be broadened relative to a projector which displays an image with an NTSC signal by using an appropriate laser light source, and thereby a display of vivid images with higher color purity becomes possible. Further, reduction in power consumption is realized as compared with a case where a lamp is used for a light source.

Figure 8:
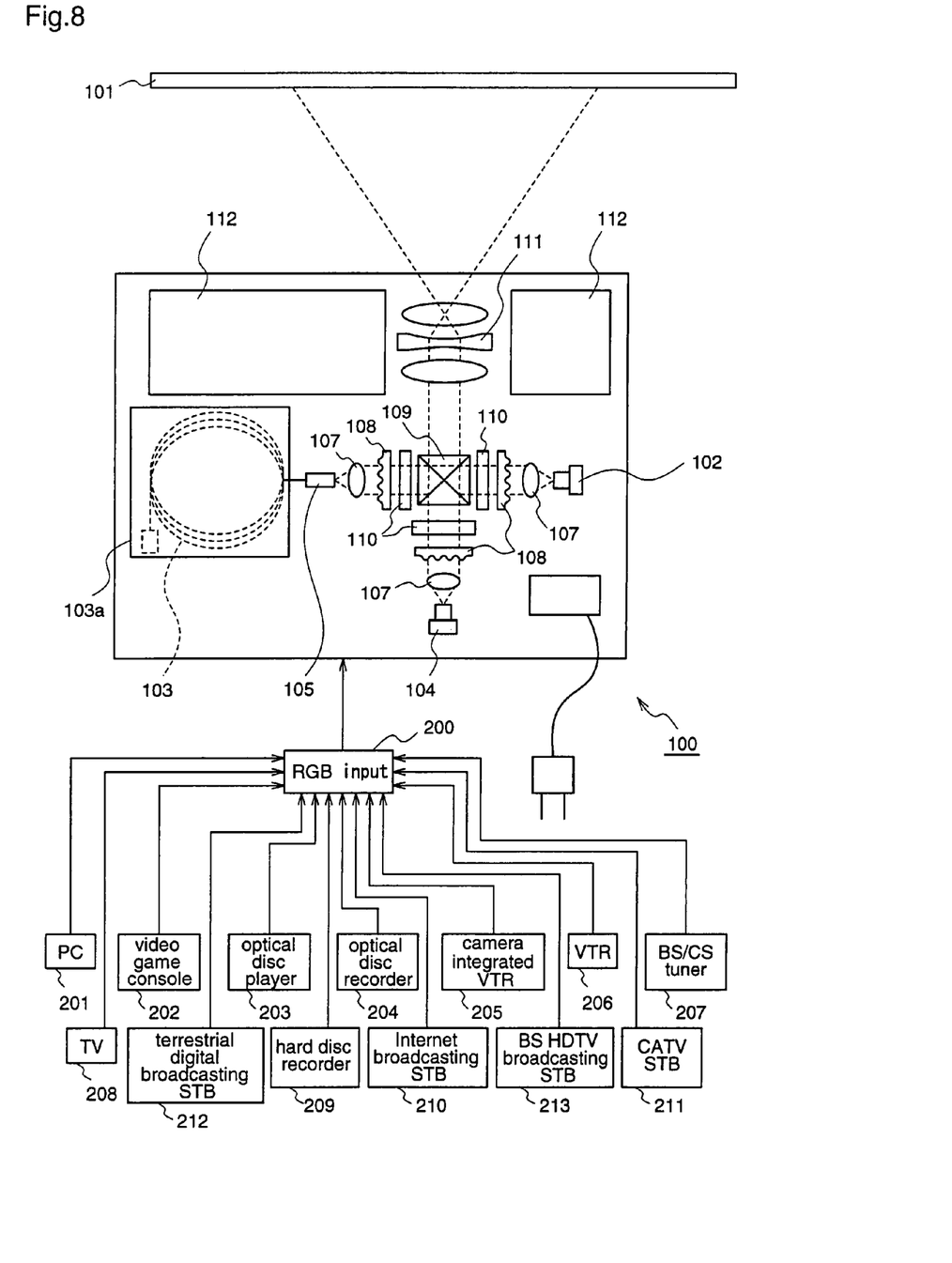
FIG. 8 is a diagram for illustrating devices which can be connected to the conventional video projector.

FIG. 8 is a diagram illustrating devices which can be connected to the above-described conventional laser display 100.

This conventional laser display 100 receives a video signal from its RGB terminals 200, and those which have output terminals for RGB signals, e.g., a personal computer 201 such as a notebook PC, a video game console 202, an optical disc player 201 such as various types of DVDs, an optical disc recorder 204 including one of a VTR integrated type, a camera integrated type VTR 205, a non-portable VTR 206, a BS/CS tuner 207, a TV 208, a hard disc recorder 209 including various optical disc drive integrated type ones, an Internet broadcasting STB (set top box) 210, a CATV STB 211, a digital terrestrial broadcasting STB 212, and a BS HDTV broadcasting STB 213.

In addition, in accordance with formats of signals outputted from a device which is connected to the laser display, a D4 input terminal, a DVI-D input terminal, an IEEE 1394 terminal, a component terminal, an S terminal, and a video terminal and the like may be provided.

Figure 9A:
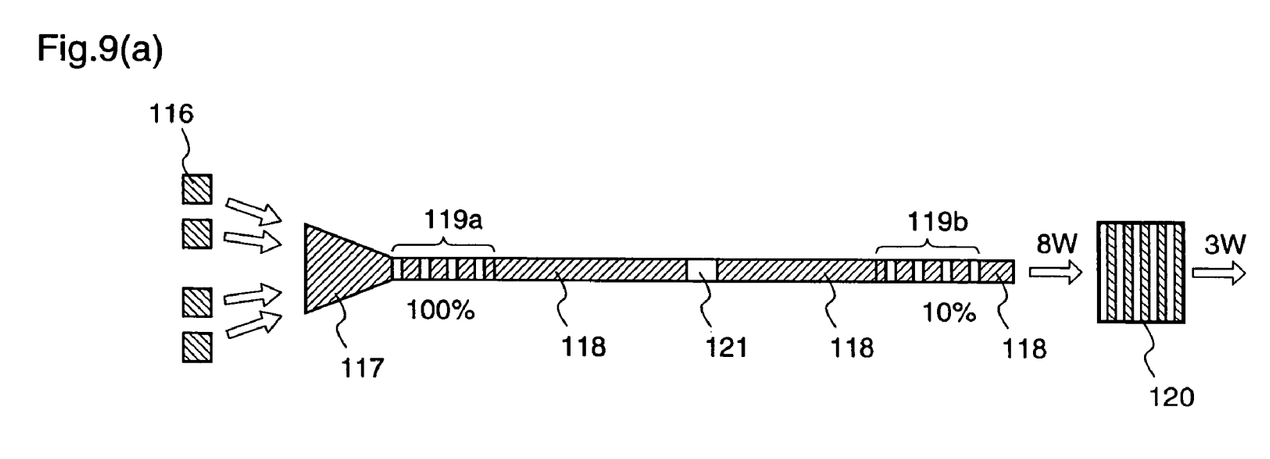
FIG. 9(a) is a diagram for illustrating a basic constitution of a fiber laser.
Figure 9B:
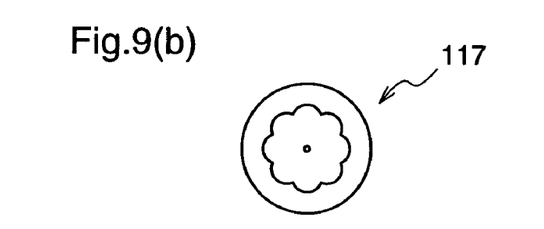
FIG. 9(b) is a cross-sectional view of a tapered fiber constituting the fiber laser.
Figure 9C:
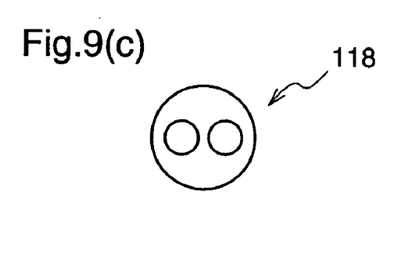
FIG. 9(c) is a cross sectional view of a rare earth doped fiber.

Further, FIG. 9(a) is a diagram illustrating a detailed constitution of the fiber laser 103, FIG. 9(b) is a cross-sectional view of a tapered fiber, and FIG. 9(c) is a cross-sectional view of a rare-earth doped fiber.

The fiber laser 103 is constituted by a pump light source 116, a tapered fiber 117, a rare-earth doped fiber 118, a fiber Bragg grating (hereinafter referred to as "FBG") 119, and a polarizer 121.

The FBG 119a which is formed at the laser beam incident side of the rare-earth doped fiber 118 has a reflectivity of about 100% against the reflected light from the output end facet. On the other hand, the FBG 119b which is formed at the laser beam output side is designed to have a reflectivity of approximately 10%.

Further, Yb (Ytterbium) is added to the rare-earth doped fiber 118, and this rare-earth doped fiber 118 is a kind of solid laser which has a function of converting the wavelength of a light from the pump light source 116 from 980 nm to 1060 nm, and absorbs a large amount of light having a wavelength of 980 nm.

Next, the operation of the fiber laser 103 will be explained.

A laser beam irradiated from the pump light source 116 is optically coupled to the rare-earth doped fiber 118 by using the tapered fiber 117. The oscillation wavelength of the pump light source 116 is 980 nm.

The wavelength of the laser beam coupled to the rare-earth doped fiber 118 is locked by the FBG 19.

The laser beam which is coupled to the rare-earth doped fiber 118 is absorbed in the rare-earth doped fiber 118, and is wavelength converted into a laser beam of a wavelength 1060 nm, and is outputted as a laser beam in the vicinity of 1060 nm. For an input light of 12 W, the output light is 8 W.

The outputted infrared light of 1060 nm is wavelength converted into a green light of a wavelength of 530 nm by the SHG(second harmonic generation) element 120. The output of the green light is 3 W.

In order to enhance the absorption of pump light in the rare-earth doped fiber 118, the length of the rare-earth doped fiber is important. That is, the rate of absorption of a pump light can be enhanced as the rare-earth doped fiber 118 is longer, and therefore a length of several meters is required. Accordingly, the rare-earth doped fiber is usually contained in a fiber laser containing box 103a in a circularly wound state (in a looped shape), as shown in FIG. 7.

Patent document 1: Japanese published patent 2003-98476 (page 4, FIG. 1)

DISCLOSURE OF THE INVENTION

Problems to be Solved by the Invention

In order to miniaturize the above-described conventional video projector, and to enhance the portability as well as to ease the attachment, considerations for miniaturization and arrangement of a fiber laser which has a large occupation area in the projector housing are required.

In addition, because the power in use and the heat generation of the fiber laser are large, heat is accumulated in the housing when in a use for a long time, and thereby the temperature in the housing is increased. As a result, the efficiency in wavelength conversion by the SHG element largely fluctuates, thereby resulting in difficulty in stabilizing the laser light output.

Further, the efficiency of wavelength conversion by the SHG element largely fluctuates due to temperature variations in the SHG element. Specifically, when the temperature of the SHG element varies by 1 degree, the efficiency of the wavelength conversion by the SHG element varies at most by approximately 50%, thereby requiring a highly precise temperature control.

Further, as for an FBG which is produced in a fiber laser, considerations for the shape change and for the temperature change are required. For example, when there a shape change arises in the FBG, it may cause fluctuations in the wavelength of the pump light source, and thereby fluctuations occur in the wavelength of the laser light that is outputted from the fiber laser. In addition, when a temperature change arises in the FBG, fluctuations occur in the wavelength of the pump light source. Such wavelength fluctuations and output fluctuations cause fluctuations in the output of the green light, resulting in a large problem.

Further, the video image projector is also required for reduction of power consumption. The reduction of power consumption is a requirement that is particularly important in carrying out a battery driving of the projector.

The present invention is made to solve the above-described problems, and has its object to provide a video projector which can enhance the stabilization of the output laser light by suppressing the temperature rise in the housing, and to realize miniaturization of the apparatus and reduction of power consumption.

Measures to Solve the Problems

In order to solve the above-described problems, the present invention provides a video projector for projecting video on a screen, comprising: a fiber laser which comprises a pump LD part for irradiating a laser beam and a fiber part for amplifying an output beam from the pump LD part, and an SHG element for converting the wavelength of the output light from the fiber laser and outputting a projection light onto the screen, wherein the fiber part is arranged so as to draw a circulating orbit of more than one circulation along the inner wall of a projector housing.

Therefore, the occupation area of the fiber laser in the projector housing can be reduced, and the projector can be miniaturized. As a result, a video projector which is easy to carry and to attach can be realized.

Further, in the above video projector, it is preferable that the SHG element and the pump LD part or the housing which includes the pump LD part are separated from each other, and the pump LD part is arranged in a state of contacting the inner wall of the housing.

Therefore, the temperature rise of the SHG element as well as the temperature rise of the pump LD can be suppressed.

Further, in the above video projector, it is preferable that the SHG element and the pump LD part are separated by more than 3 cm.

Therefore, it is suppressed that influences by heat generated by the pump LD part are affected on the SHG element and it is possible to attain stabilization of the output of the SHG element.

Further, in the above video projector, it is preferable that the fiber bragg grating which constitutes the fibber part is fixed so that its shape is not changed.

Therefore, it is possible to stabilize the output of a light outputted from the SHG element by preventing the shape change of the fiber bragg grating.

Further, in the above video projector, it is preferable to carry out control for suppressing the temperature change of the fiber bragg grating which constitutes the fiber part.

Therefore, it is possible to stabilize the oscillation wavelength of the pump LD part by suppressing the temperature change of the fiber bragg grating.

Further, in the above video projector, it is preferable that the fiber bragg grating which constitutes the fiber part is isolated from the air in the housing.

Therefore, it is possible to stabilize the oscillation wavelength of the pump LD part by suppressing the temperature change of the fiber bragg grating.

Further, in the above video projector, it is preferable that a marker for identifying the polarization direction is formed at a part of the fiber part.

Therefore, since the polarization direction of irradiation light from the fiber laser can be checked visually, it is possible to easily coincide the polarization direction of the irradiation light from the fiber laser with the polarization direction of the SHG element.

Further, in the above video projector, it is preferable to comprise a photoelectric conversion element for converting a fundamental wave which was not wavelength converted by the SHG element into electric power.

Therefore, since a fundamental wave which was not wavelength converted by the SHG element can be converted into electric power, and the electric power can be used as a driving voltage of the projector, it is possible to realize low power consumption.

Further, the video projector of the present invention comprises a fiber laser comprising a pump LD part for irradiating a laser beam and a fiber part for amplifying the irradiation beam from the pump LD part, wherein the pump LD part is arranged external to a projector housing.

Therefore, it is possible to radiate the heat generated by the pump LD part external to the projector housing, whereby the temperature rise in the projector housing can be suppressed.

Further, in the above video projector, it is preferable that the fiber part is incorporated in a power code of the video projector and the pump LD part is incorporated in a connector part of the power code.

Therefore, it is possible to secure the length of the fiber part by using the power code and the space in the projector housing can be reduced.

Further, in the above video projector, it is preferable to comprise a photoelectric conversion element for converting light which was not used in the wavelength conversion into electric power among the irradiation lights from the fiber laser.

Therefore, since it is possible to convert light which was not used in the wavelength conversion into electric power, and the electric power can be used as a driving voltage of the projector, low power consumption can be realized.

Further, the video projector according to the present invention comprises a fundamental wave light source for irradiating a fundamental wave and an SHG element for converting the wavelength of irradiation light from the fundamental wave light source and outputting a projection light onto a screen, wherein the video projector comprises a photoelectric conversion element for converting a fundamental wave which was not wavelength converted by the SHG element into electric power.

Therefore, the fundamental wave which has not been subjected to wavelength conversion by the SHG element can be converted into electric power which is in turn utilized as a driving voltage of the projector, thereby realizing lower power consumption.

Further, in the above video projector, it is preferable that the photoelectric conversion element is made of a material using either Si, Ge, CdS, InP, CdTe, GaAs, or AlSb.

Therefore, high efficiency in electrical power conversion can be realized.

The Effects of the Invention

According to the video projector of the present invention, since the fiber part of the fiber laser is arranged so as to draw a circulating orbit of more than one circulation along the inner wall of the projector housing, it is possible to reduce the space in the projector housing, and as a result, the video projector can be miniaturized.

Further, according to the video projector of the present invention, since the pump LD part of the fiber laser is arranged external to the projector housing, it is possible to radiate the heat generated by the pump LD part external to the projection housing, whereby temperature rise can be suppressed as well as the output stability of the SHG element can be enhanced.

Further, according to the video projector of the present invention, since the temperature change and the shape change of the fiber Bragg grating constituting the fiber part are prevented, light output can be stabilized.

Further, according to the video projector of the present invention, since a fundamental wave which was not converted by the SHG element is converted into electrical power by using a photoelectric conversion element, and the converted electrical power is used as a driving voltage of the video projector, lower power consumption of the video projector can be realized.

DESCRIPTION OF REFERENCE NUMERALS 1a-1d . . . video projector
1 . . . housing
2 . . . laser
3a . . . pump LD part
3b . . . fiber part
4 . . . semiconductor laser
5 . . . SHG element
6 . . . semiconductor laser
7 . . . lens
8 . . . integrator
9 . . . prism
10 . . . liquid crystal panel
11 . . . projection lens
12 . . . control circuit
13 . . . screen
14 . . . FBG
15 . . . power cable
16 . . . connector part
17 . . . dichroic mirror
18 . . . photoelectric conversion device
19 . . . FBG fixing part
20 . . . blue semiconductor laser
21 . . . red semiconductor laser
22 . . . green SHG laser
23 . . . battery
24 . . . dichroic mirror
25 . . . scanning mirror
26 . . . lens
27 . . . liquid crystal panel.
28 . . . photoelectric conversion device
29 . . . infrared dichroic mirror
30 . . . projection lens
31 . . . marker
100 . . . laser display
102 . . . semiconductor laser
103 . . . fiber laser
103a . . . fiber laser containing box
104 . . . semiconductor laser
105 . . . SHG element
107 . . . lens
108 . . . integrator
109 . . . prism
110 . . . liquid crystal panel
111 . . . projection lens
112 . . . control circuit
116 . . . pump light source
117 . . . taper fiber
118 . . . rare earth doped fiber
119, 119a, 119b . . . fiber Bragg grating
120 . . . SHG element
121 . . . polarizer
201 . . . personal computer
202 . . . video game console
203 . . . optical disc player
204 . . . optical disc recorder
205 . . . camera integrated VTR
206 . . . non-portable VTR
207 . . . BS/CS tuner
208 . . . TV
209 . . . hard disc recorder
210 . . . internet broadcasting STB
211 . . . CATV STB
212 . . . terrestrial digital broadcasting STB
213 . . . BS HDTV broadcasting STB

BEST MODE FOR CARRYING OUT THE INVENTION

First Embodiment

Figure 1:
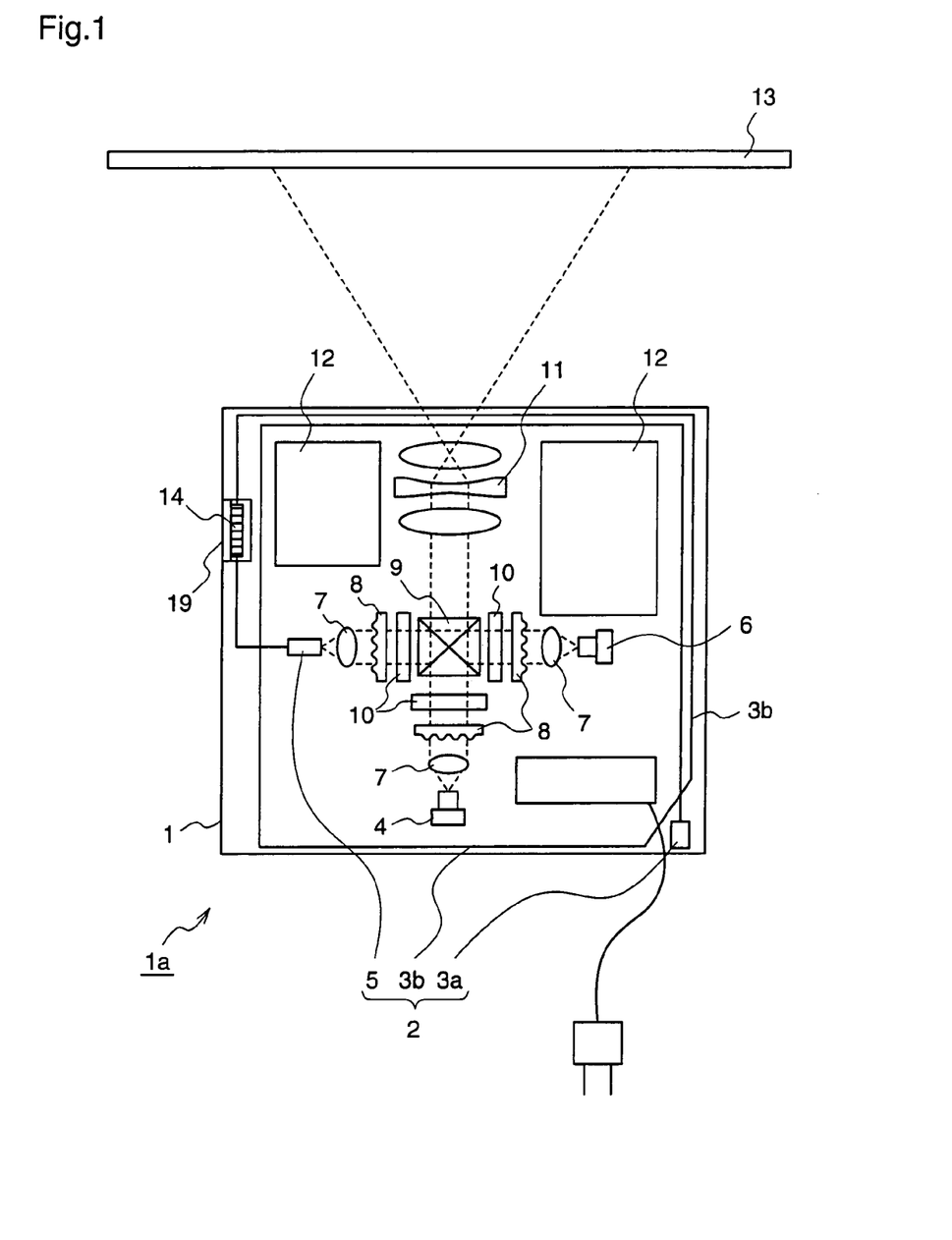
FIG. 1 is a diagram for illustrating a schematic construction of a video projector according to the first embodiment.

FIG. 1 is a diagram for illustrating the schematic construction of a video projector 1a according to a first embodiment.

The video projector 1*a* according to the first embodiment comprises lasers 2,4,6 for generating red, green, and blue laser beams, lenses 7 for converting respective laser beams into parallel lights, integrators 8 for equalizing the light intensity of the light that has been transmitted through the lens 7, a liquid crystal panel for transmitting the light from the integrator 8, a control circuit 12 for controlling the liquid crystal panel 10, a transmitted light prism 9 for multiplexing the light which has transmitted through the respective liquid crystal panel, and a projection lens 11 for projecting the light from the transmitted light prism 9 onto a screen 13.

The lasers 4, 6 are semiconductor lasers, and respectively irradiate a red laser beam and a blue laser beam.

Further, the laser 2 comprises a fiber laser 3 comprising a pump LD part 3*a* for irradiating a laser beam and a fiber part 3*b* for amplifying the irradiation light from the pump LD part and a SHG element 5 for converting the wavelength of the irradiation light from the fiber laser 3, and outputting a projection light onto the screen 13. This laser 2 wavelength converts an infrared light with a wavelength in the vicinity of 1,060 nm-1,080 nm as an irradiation light from the fiber laser 3 by the SHG element 5, and irradiates a green laser beam.

In addition, a semiconductor laser serving as a pump light source is incorporated in the pump LD part 3*a*.

Further, the fiber part 3*b* is constituted by a tapered fiber 117, a rare-earth doped fiber 118, an FBG 119, and a polarizer 121, as shown in FIG. 9(*a*). The rare-earth doped fiber 118 which constitutes the fiber part 3 is added with Yb in this embodiment, and is a kind of solid laser that has a function for converting the wavelength from 980 nm to 1,060 nm of a light irradiated from the pump LD 3*a*, and absorbs a large amount of light having a wavelength of 980 nm. Further, the FBG 19 which constitutes the fiber part 3*b* locks the oscillation wavelength of the pump semiconductor laser.

Next, the operation of the video projector 1*a* according to the first embodiment will be explained.

The RGB three colors of lasers which are irradiated from respective lasers 2, 4, 6 are converted into parallel lights by using the lenses 7, respectively, and then they are equalized in their light intensity by using the integrators 8, and transmitted through the liquid crystal panel 10.

Then, the lights which have been transmitted through the liquid crystal panel 10 are synthesized by using the transmission light prism 9, and are projected onto the screen 13 by using the projection lens 11.

In this way, a two-dimensional image is displayed on the screen 13.

Next, a realizing method of miniaturization of the projector itself and a suppressing method of temperature rise inside the projector in this first embodiment will be described below.

(1) As for Arrangement of the Fiber Part 3*b*

In order to realize miniaturization of the projector itself, the fiber part 3*b* is wired by using the internal wall portion of the video projector housing 1. More specifically, the fiber part 3*b* is disposed so as to draw a circulation comprising more than one circulation along the internal wall of the housing 1, as shown in FIG. 1. Thereby, a length of a fiber which can absorb all the pump lights can be secured. Further, since the occupation area of the fiber laser 3 in the video projector housing 1 is reduced, the size of the video projector is reduced by about 30 and thereby the portability and installment of the projector are eased. It is needless to say that the fiber part 3*b* may apparently be disposed by using the bottom surface and the top plate of the video projector housing.

(2) As for Disposition of the FBG 14

In order to suppress the temperature rise inside the projector, the FBG 14, which is provided at a portion of the fiber winding 3*b*, is fixed so as not to experience a shape change. This is because variations might occur in the oscillation wavelength of the pump semiconductor laser due to a shape change of the FBG. When for example the shape of the FBG is bent, periods of gratings formed on the FBG may be uneven, thereby making the oscillation wavelength of the pump semiconductor laser not a single oscillation mode. In addition, it is observed that when the FBG is deformed by mechanical oscillation, the oscillation wavelength shape of the pump semiconductor laser is changed. As described above, when the oscillation wavelength of a pump semiconductor laser deviates, the absorption efficiency of a rare-earth doped fiber changes accordingly, and this in turn results in deviation in the converted light output that is outputted from the rare-earth doped fiber. Also when the temperature of the FBG changes, the effective grating period of the grating that is formed at the FBG is deviated, and this results in deviation in the oscillation wavelength of the pump semiconductor laser. As a result, the output of the green light that is outputted from the SHG element is deviated, and this would affect unfavorable influences on the color balance in the video images which are projected from the video projector. In this embodiment, as a measure to the above problem, the FBG 14 is fixed onto the FBG fixation portion 19 so as to make the shape of the FBG 14 a linear shape. Thereby, deviations in the oscillation wavelength of the pump semiconductor laser that would depend on the deformation of the FBG 14 are prevented, and thereby the stabilization of the green light output is realized.

Further, as a measure to stabilize the temperature variation of the FBG, the FBG 14 is isolated from the air in the video projector housing 1. Since the temperature in the video projector housing 1 rises up affected by the elements generating heat in the housing after the power is turned on, if the FBG 14 is disposed at a portion that occurs a temperature rise in the projector housing 1, the temperature of the FBG 14 itself would be affected. Therefore, in this embodiment, the FBG 14 is disposed at a position at which it is in contact with the air which is external to the projector. More specifically, it is realized by providing a concave portion on the housing 1 as shown in FIG. 1. Thereby, since the air outside the projector, that is, the room temperature would have less temperature variation with relative to the air in the apparatus, the temperature of the FBG is easily held stable.

Further, when the restriction for power consumption is not severe, it is possible to suppress the temperature change in the FBG by providing a temperature adjusting mechanism for carrying out a control to suppress the temperature change of the FBG 14 at the FBG fixation portion 14. As a realizing method for the temperature adjusting mechanism, it is effective to add a Pertier element or the like to the FBG fixation portion 19. Since the FBG 14 itself involves no large heat generation, there may occur no large power dissipation even when the temperature adjustment is carried out by a Pertier element.

(3) As for Disposition of the Pump LD 3*a*

In this embodiment, the pump LD part 3*a* which serves as a heat generating source is arranged as far as possible from the SHG element 5. This makes it difficult for the heat generated by the pump LD part 3*a* to be transmitted to the SHG element 5.

Figure 2:
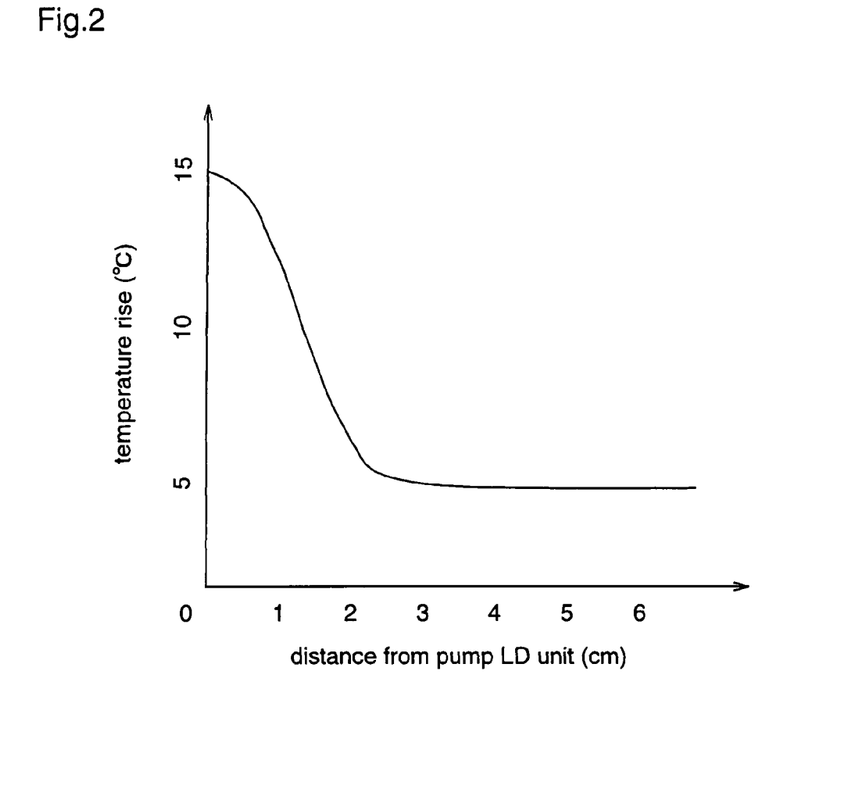
FIG. 2 is a diagram for illustrating relationship between the distance from a pump semiconductor laser to a SHG element and temperature rise in the SHG element in the first embodiment.

FIG. 2 shows the relationship between a distance from the pump LD part 3*a* and temperature rise at the periphery thereof. The ordinate indicates the temperature rise from the room temperature. Here, the peripheral temperature indicates the temperature inside the housing 1. FIG. 2 shows the result obtained in a case where a pump semiconductor laser with heat generation of 15 W and a fan are employed.

As can be seen from FIG. 2, as the pump LD part 3a is separated farther from the SHG element, the temperature in the housing 1 is lowered, and the temperature inclination is gone at a point which is apart more than 3 cm.

Accordingly, if the pump LD part 3a is disposed by more than 3 cm apart from the SHG element 5, the influences by the heat generated at the pump LD part 3a are small and it is possible to prevent those influences from unfavorably affecting the conversion efficiency of the SHG element 5.

Further, if the pump LD part 3a is disposed by more than 3 cm apart from the SHG element 5, it is also possible to suppress the temperature change of the FBG 14, thereby realizing the stabilization of the oscillation wavelength of the pump semiconductor laser.

Further, if the pump LD part 3a is disposed in contact with the inner wall of the housing 1, it is possible to intensively radiate heat generated at the pump LD part 3. That is, by making the pump LD part 3a in contact with the inner wall of the housing, it is possible to utilize the whole of the housing 1 as a heatsink, which in turn results in enhancing efficiency in heat radiation and it is also possible to suppress the temperature rise inside the housing 1.

Figure 3:
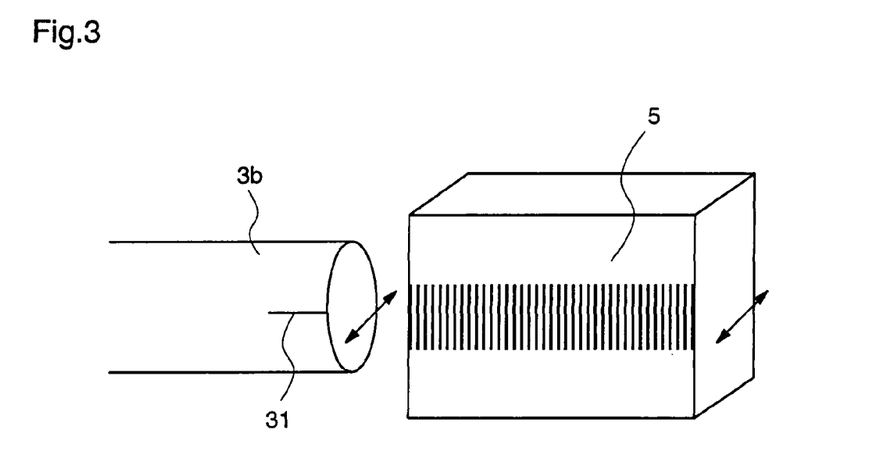
FIG. 3 is a diagram for illustrating a marker on the tip of a fiber laser.

Next, a measure for making the direction of the irradiated light from the fiber laser 3 coincide with the polarization direction of the SHG element 5 will be described with reference to FIG. 3.

While it is normally required that the polarization direction of the laser light that is outputted from the fiber part 3b coincide with the polarization direction that is wavelength converted by the SHG element 5, the polarization direction cannot be recognized only by viewing the fiber part 3b.

Then, this embodiment includes a marker 31 at the top of the fiber part 3b so as to enable seeing the polarization direction. The addition of the marker 31 has resulted in large reductions in assembly time at the device assembly as well as reduction in mistakes in manufacture. Besides, the marker 31 may be added not only to the top of the fiber part 3b but to any elements included in the fiber part 3b. For example, if a marker is added to the polarizer 121 shown in FIG. 9, the polarization direction can be seen, providing convenience.

In the video projector 1a of the first embodiment described above, the fiber part 3b of the fiber laser is disposed so as to draw a circulating orbit of more than one circulation along the inner wall of the housing 1. Therefore, the influences by the fiber laser 3 which occupies a large area in the conventional image projector are reduced, and miniaturization of a video projector itself is realized.

Further, the video projector 1a of the first embodiment disposes the pump LD part 3a of the fiber laser 3 which forms a heat source at a position apart from the SHG element 5 and the FBG 14, and therefore, it is prevented that the heat generated by the pump LD 3a should affect the SHG element 5 and the FBG 14, thereby realizing the stabilization of the light output from the SHG element 5.

Further, the video projector 1a of the first embodiment has prevented the temperature change and shape change of the FBG 14 which is produced at a part of the fiber laser 3, and therefore, the stabilization of the light output which is outputted from the SHG element 5 can be easily realized. Such construction provides quite an effective means of incorporating a video projector in, for example, a notebook type personal computer.

While a video projector which is of a type that projects laser light onto the screen 13 and displays a video by the reflection by the screen 13 is described in the first embodiment, it is apparent that the present invention can be also applied to a rear-projection type video projector which projects a laser light from the back of the screen.

While also a case where a transparent type liquid crystal panel is used for two dimensional image display is described in the first embodiment, the present invention can be also applied to a scanning type video projector which uses a reflective type liquid crystal device, a DMD (Digital Micomirror Device), a polygon mirror, a Galvano mirror and the like.

Second Embodiment

Figure 4:
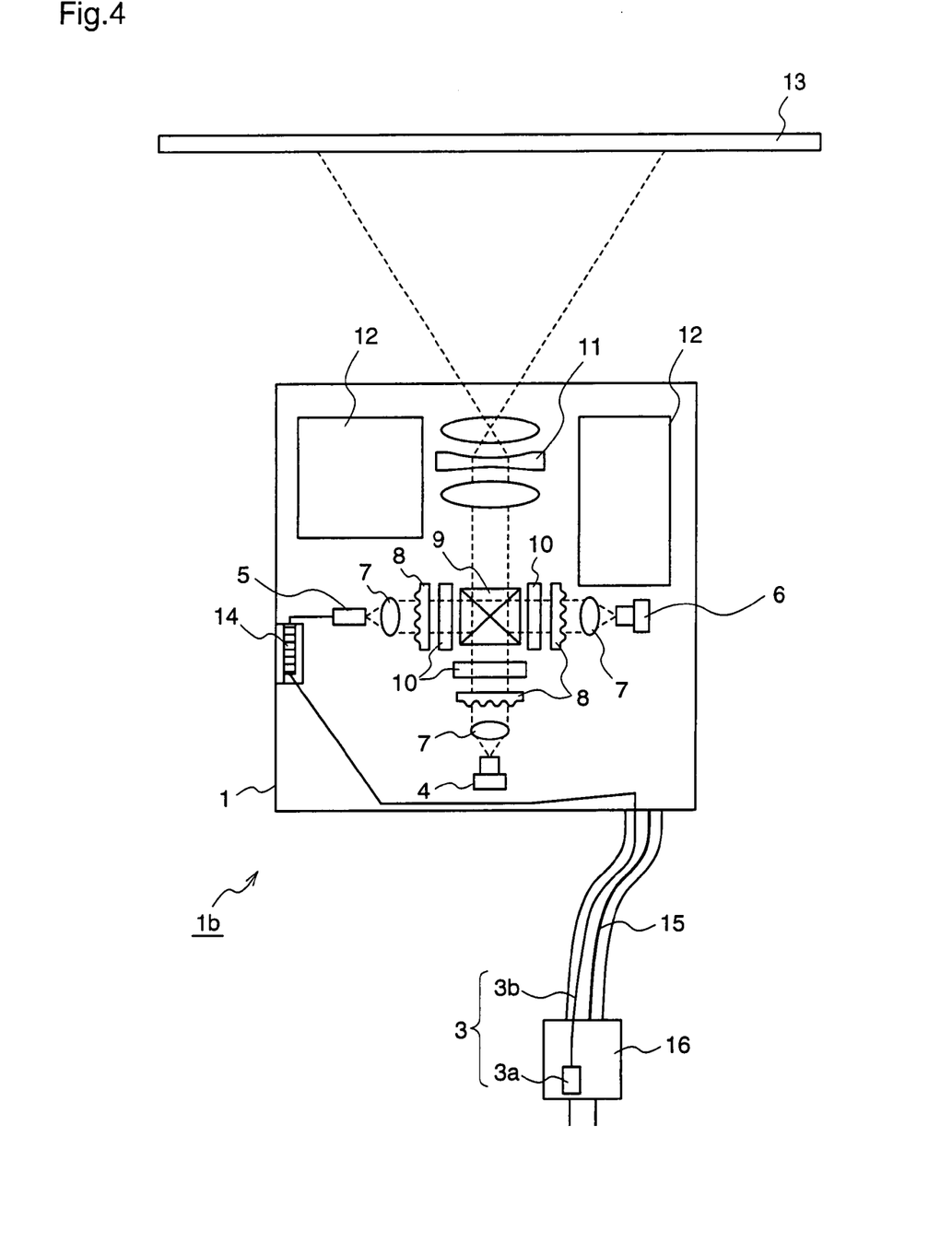
FIG. 4 is a diagram for illustrating a schematic construction of a video projector according to the second embodiment.

This second embodiment provides a video projector having a construction in which the pump LD part 3a and the fiber portion 3b constituting the fiber laser 3 are separated from the video projector housing 1.

FIG. 4 is a diagram for illustrating a schematic construction of a video projector 1b according to the second embodiment. In FIG. 4, the same components as in FIG. 1 are assigned with the same reference numerals.

The video projector 1b according to the second embodiment has differences in their construction from that of the video projector 1a of the first embodiment in that the pump LD part 3a of the fiber laser 3 is incorporated in a connector part 16 of a plug for connection to an outlet, and the fiber portion 3b is incorporated in a power cord. This constitution is very effective in a case where a power supply voltage for the video projector is supplied through an outlet.

Hereinafter, the effect will be explained.

The pump LD part 3a is incorporated in the connector part 16 of a plug for connection to an outlet, which connector part is located external to the projector housing 1. So, heat generated by this pump LD part 3a is radiated at the connector part 16 of the outlet. Thus, since the heat generated at the pump LD part 3a is radiated external to the housing 1, influences affected by heat on the SHG element 5 and the FBG 14 which exist in the housing 1 can be avoided completely. Thereby, the stabilization of the wavelength-converted green light output that is outputted from the SHG element 5 is realized.

The fiber part 3b is bundled together with the power cable 15, and is connected to the projector housing 1. Since the length of the power cable is more than 1 m, the length of the fiber part 3b can be secured. Therefore, it is not necessary to dispose the fiber winding 3b so as to draw a circulating orbit of more than one circulation along the inner wall of the projector housing as in the first embodiment, thereby realizing miniaturization of more than 40% as compared with the conventional constitution, and making the movement and installment of the projector quite easy.

Thus, in the video projector 1b of the second embodiment, the pump LD part 3a of the fiber laser 3 is incorporated in the connector part 16, and the fiber winding 3b is incorporated in the power cord, and therefore, the area occupied by the fiber laser 3 in the housing 1 can be further eliminated, and thus, the video projector can be miniaturized. Further, the heat generated at the pump LD 3a is radiated external to the housing 1, and influences which are affected by heat inside the housing 1 can be completely removed, thereby realizing the output laser light that is emitted from the SHG element.

While a video projector which is of a type that projects laser light onto the screen 13 and displays a video by the reflection by the screen 13 is described in the second embodiment, it is apparent that the present invention can be applied to a rear-projection type video projector which projects laser light from the back of a screen.

While also a case where a transparent type liquid crystal panel is used for two dimensional image display is described in the second embodiment, the present invention can be applied to a scanning type video projector which uses a reflective type liquid crystal device, a DMD (Digital Micomirror Device), a polygon mirror, a Galvano mirror and the like.

Third Embodiment

This third embodiment provides a video projector having a constitution aimed at reducing power consumption of the projector itself.

Figure 5:
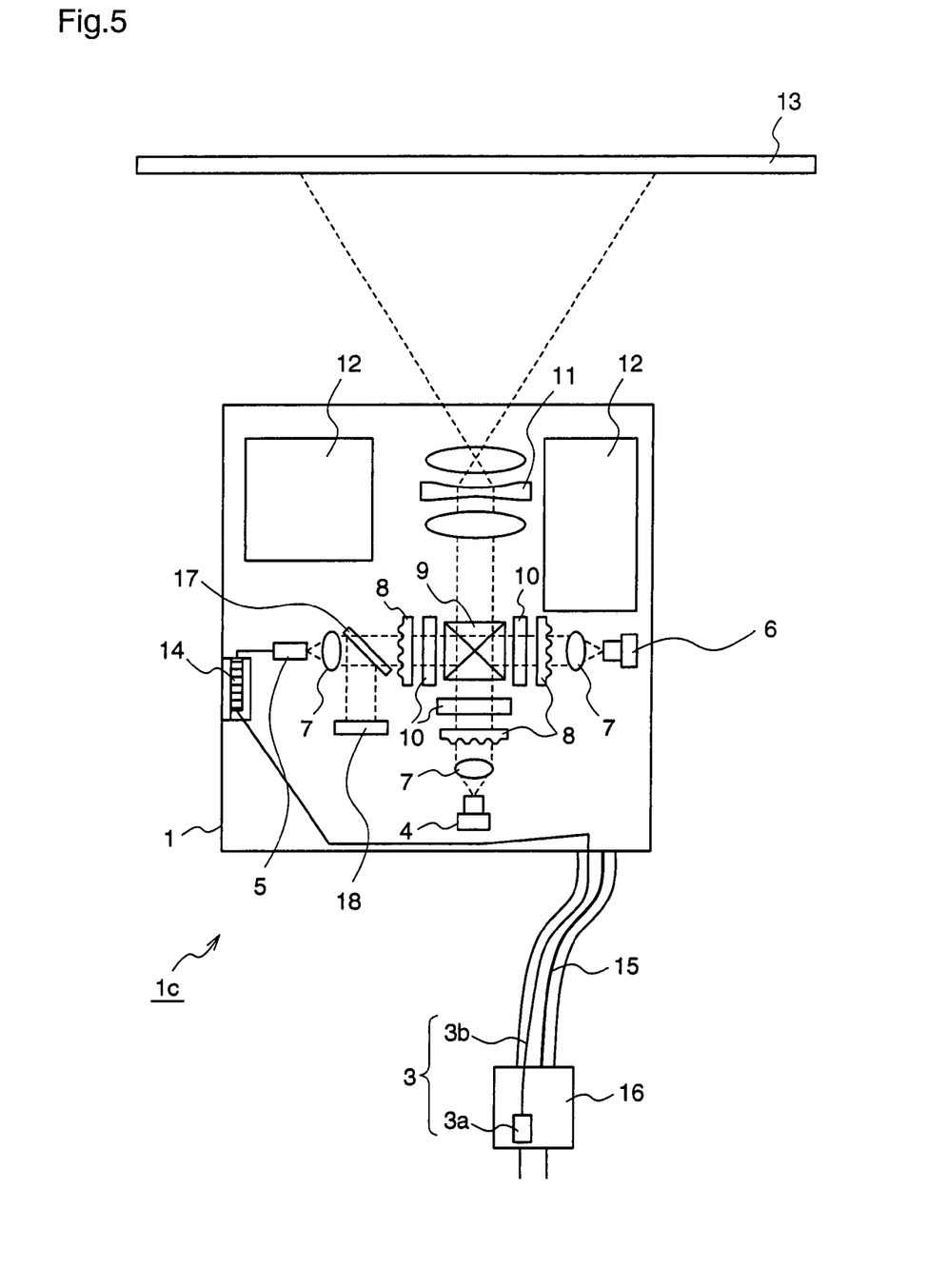
FIG. 5 is a diagram for illustrating a schematic construction of a video projector according to the third embodiment.

FIG. 5 is a diagram for illustrating a schematic construction of a video projector 1c according to the third embodiment. In FIG. 5, the same components as in FIG. 4 are assigned with the same reference numerals.

The video projector 1c of this third embodiment has differences in its construction from the video projector 1b of the second embodiment in that a dichroic mirror is provided in front of the irradiation light that is outputted from the SHG element as well as in that there is provided a photoelectric conversion device 18 which receives a light that is branched by the dichroic mirror 17.

Hereinafter, a mechanism for converting a fundamental wave which has not been wavelength converted by the SHG element 5 into electric power will be described.

An infrared light as a fundamental wave and a wavelength-converted harmonic wave are outputted from the SHG element 5. Here, a fiber laser is used as a fundamental wave light source for generating a fundamental wave similarly as in the first and second embodiments. Conventionally, while a green light as a harmonic is used for being displayed on a display, an infrared light as a fundamental wave is removed as an unnecessary light by such as a wavelength separation filter or an infrared absorption filter. However, in this embodiment, only an infrared light is reflected by using a dichroic mirror 17, to be incident to the photoelectric conversion device 18.

Further, a silicon series solar battery is used for the photoelectric conversion device 18 in this embodiment. A solar battery is commonly used, easily available, and can be miniaturized. Further, as photoelectric conversion devices, one that is selected from materials of Ge, CdS, InP, CdTe, GaAs, and AlSb can be used.

The infrared light which has not been wavelength converted by the SHG element is incident to the photoelectric conversion device 18 with branched by the dichroic mirror 17, and is converted into electric power by the photoelectric conversion device 18, and is used as a driving power for the video projector 1c. The efficiency in power generation of the solar battery is about 15%. Since the output of the infrared light as unnecessary light was about 5 W, electric power of 0.75 W was generated by the solar battery as the photoelectric conversion device 18. The electric power generated here is reused for driving the circuits or the components. Since in this embodiment a fiber laser which is a high power output light source is used as a fundamental wave light source, a large amount of converted electric power can be obtained, thereby presenting a large effect. Further, by the utilization of the photoelectric conversion device 18, approximately 5% reduction in power consumption of the projector is realized as a whole apparatus.

Thus, in the video projector 1c of the third embodiment, since the infrared light which has not been wavelength converted by the SHG element 5 would be converted into the electric power to be used as a driving power for driving the video projector, it is possible to accomplish reduction in the power dissipation as a whole projector.

A type of video projector which projects a laser beam onto the screen 1 and displays a video utilizing the reflection by the screen 13 is described in this third embodiment. However, it is apparent that the present invention can be applied to a rear-projection type video projector which projects a laser light from the back of the screen.

Further, a transparent type liquid crystal panel is used for displaying two dimensional video in this third embodiment. However, the present invention can be also applied to a scanning type video projector which uses such as a reflective liquid crystal device, a DMD, a polygon mirror, or a galvano mirror.

Fourth Embodiment

This fourth embodiment provides a battery driven video projector which comprises a mechanism for converting an infrared light which has not been wavelength converted by an SHG element into electric power.

Figure 6:
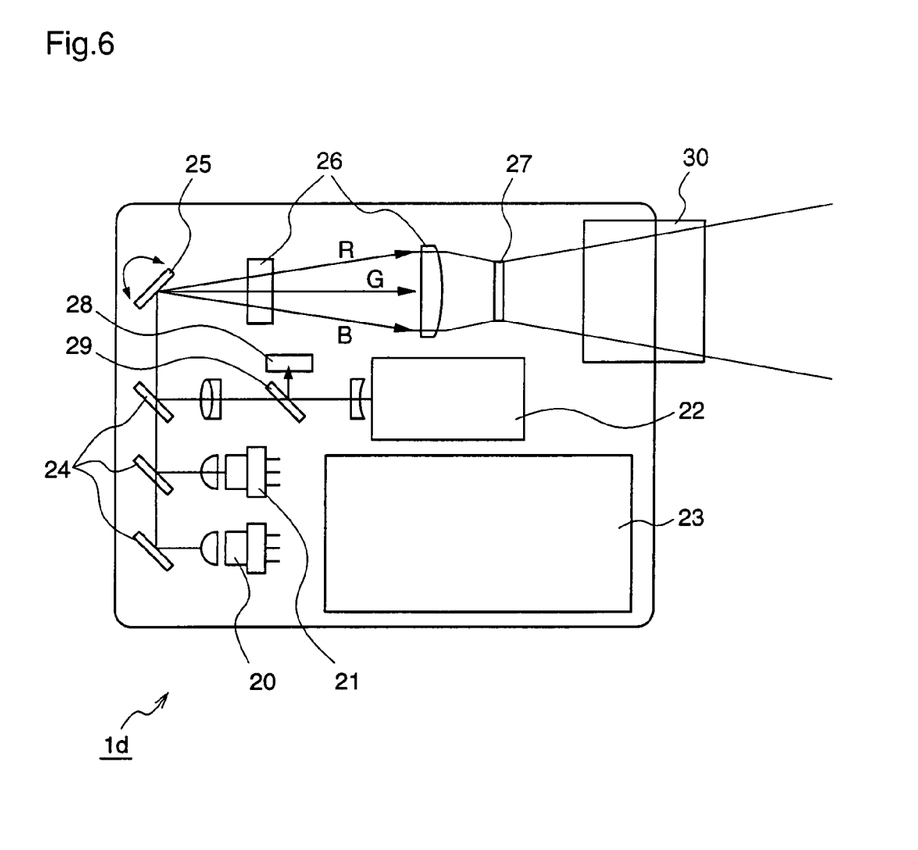
FIG. 6 is diagram for illustrating a schematic construction of a battery driving type video projector according to the fourth embodiment.

FIG. 6 is a diagram for illustrating a schematic construction of a battery driven video projector 1d according to the fourth embodiment.

The video projector 1d of this fourth embodiment includes a blue semiconductor laser 20, a red semiconductor laser 21, a green SHG laser 22, a battery 23, dichroic mirrors 24, a scanning mirror 25, lenses 26, a liquid crystal panel 27, a photoelectric conversion device 28, an infrared dichroic mirror 29, and a projection lens 30.

Next, the operation of the video projector 1d of this fourth embodiment will be explained.

The RGB three color lasers of red, green, and blue are generated by using the blue semiconductor laser 20, the red semiconductor laser 21, and the green SHG laser 22, and are synthesized by using the dichroic mirrors 24. The synthesized laser lights are equalized in their strengths by the scanning mirror 25, and are irradiated to the liquid crystal panel 27 by using the lenses 26. The laser lights which have been transmitted through the liquid crystal panel 27 are projected onto the screen by the projection lens 30.

In this way, video is projected on the screen.

Next, a measure for reducing power consumption in a battery driven type video projector will be described.

Normally, three colors of lasers, a scanning mirror, a liquid crystal panel, and a driving circuit of the projector are supplied with electric power from the battery 23. In such battery driven video projector, reduction of power consumption is a very important issue.

In this embodiment, an infrared light which was not wavelength converted by the green SHG laser 22 is branched by using the dichroic mirror 29 and is made incident to the photoelectric conversion device 28. The infrared light which is incident to the photoelectric conversion device 28 is converted into electric power, to be used for driving the projector. Thereby, approximately 5% of reduction in power consumption of the projector is realized as a whole apparatus, and lengthening of the lifetime of the battery is realized.

In the video projector 1d of the fourth embodiment, an infrared light which has not been wavelength converted by the green SHG laser 22 is converted into electric power by using the photoelectric conversion device 28 to be used as a driving voltage for the projector, and therefore, reduction of power consumption as well as lengthening of the lifetime of the battery are realized.

While a battery driven video projector which is provided with a mechanism for converting an infrared light which has not been wavelength converted by the SHG laser 22 into electric power is described in this fourth embodiment, any of the video projectors of the first to third embodiments can be applied to the battery driven type video projector described in this embodiment. In that case, the fundamental wave which has not been wavelength converted by the SHG element 5 will be converted into electric power.

A type of video projector which projects a laser beam onto the screen 13 and displays a video utilizing the reflection by the screen 13 is described in this fourth embodiment. However, it is apparent that the present invention can be applied to a rear-projection type video projector which projects a laser light from the back of the screen.

Further, a transparent type liquid crystal panel is used for displaying two dimensional video in this fourth embodiment. However, the present invention can be also applied to a scanning type video projector which uses such as a reflective liquid crystal device, a DMD, a polygon mirror, or a Galvano mirror.

INDUSTRIAL APPLICABILITY

The video projector according to the present invention can be used as a laser display which can enhance the portability as well as ease the attachment, and particularly effective when, for example, this video projector is incorporated into a notebook type personal computer.

The invention claimed is:

1. A video projector for projecting video, said video projector comprising:
    a projector housing;
    a fiber laser which comprises a pump LD part for emitting a laser beam, and a fiber part, comprising rare-earth doped fiber, for amplifying the emitted laser beam from said pump LD part; and
    an SHG element for converting the wavelength of the emitted light from said fiber laser and outputting a projection light, wherein,
        said fiber part is disposed along the inner wall of said projector housing and winds for more than one circulation along said interior wall of said projector housing.

2. The video projector as defined in claim 1, wherein said SHG element and said pump LD part are separated, and said pump LD part is arranged in a state of contacting said inner wall of said projector housing.

3. The video projector as defined in claim 2, wherein said SHG element and said pump LD part are separated by more than 3 cm.

4. The video projector as defined in claim 1, further comprising a fiber Bragg grating, at a portion of said fiber part, wherein said fiber Bragg grating is fixed so that the shape of said fiber Bragg grating does not change.

5. The video projector as defined in claim 1, further comprising a control circuit for performing control for suppressing the temperature change of said fiber Bragg grating.

6. The video projector as defined in claim 1, wherein said fiber Bragg grating is isolated from air in said projector housing.

7. The video projector as defined in claim 1, further comprising a marker, at a part of said fiber part, for identifying the polarization direction.

8. The video projector as defined in claim 1 further comprising a photoelectric conversion element for converting a fundamental wave, that was not wavelength converted by said SHG element, into electric power.

9. A video projector for use with a screen and for projecting video onto the screen, said video projector comprising:
    a projector housing;
    a power cord including a connector part; and
    a fiber laser comprising a pump LD part for irradiating a laser beam and a fiber part for amplifying an irradiation beam from said pump LD part, wherein said fiber part is incorporated in said power cord, and said pump LD part is incorporated in said connector part of said power cord, and said pump LD part is arranged external to said projector housing.

10. The video projector as defined in claim 9 further comprising a photoelectric conversion element for converting a light, that was not used in wavelength conversion, among the irradiation lights from said fiber laser, into electric power.

11. The video projector as defined in claim 9, further comprising an SHG element for converting the wavelength of the emitted light from said fiber laser and outputting a projection light.

12. The video projector as defined in claim 11, further comprising a screen, wherein said SGH element outputs the projection light onto said screen.

13. The video projector as defined in claim 1, wherein said SHG element and said projector housing which includes said pump LD part are separated, and said pump LD part is arranged in a state of contacting the inner wall of said projector housing.

14. The video projector as defined in claim 1, further comprising a screen, wherein said SGH element outputs the projection light onto said screen.

* * * * *